Jan. 2, 1962   R. C. ECKLER ET AL   3,015,713
AUTOMATIC DECONTAMINATION OF WELDING ELECTRODES
Filed March 9, 1959
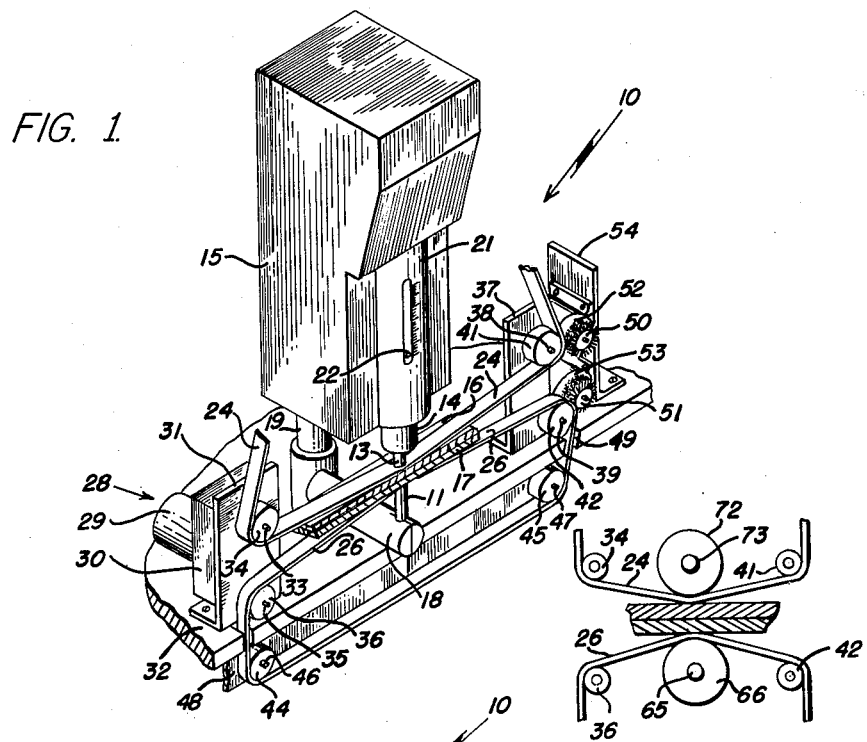
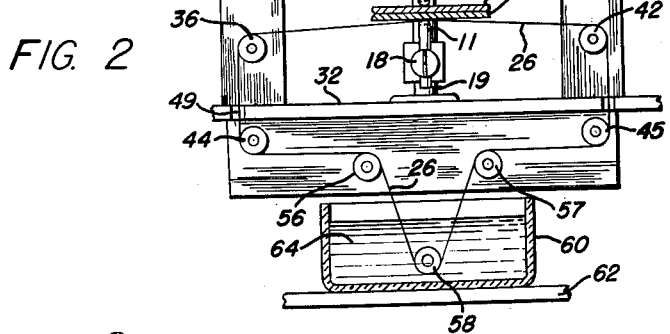
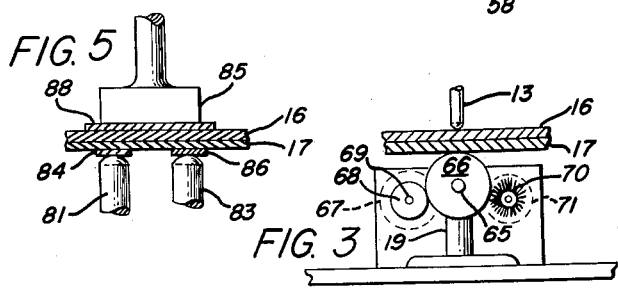
INVENTORS
RICHARD C. ECKLER
AUSTIN L. MORRILL
BY  *H. Vincent Harsha*
ATTORNEY

United States Patent Office 3,015,713
Patented Jan. 2, 1962

3,015,713
AUTOMATIC DECONTAMINATION OF WELDING ELECTRODES
Richard C. Eckler, Wayland, and Austin L. Morrill, Marlboro, Mass., assignors to Raytheon Company, a corporation of Delaware
Filed Mar. 9, 1959, Ser. No. 797,983
10 Claims. (Cl. 219—86)

This invention relates to welding apparatus and, more particularly, to means for automatically preventing the formation of contaminating material upon the welding electrodes. Resistance welding apparatus is well known wherein the heat necessary to cause welding of the materials to be joined is produced by virtue of the resistance of the metals to the passage of an electric current. The heat generated within the workpieces is proportional to the product of the square of the welding current in amperes, the resistance of the path to which the current flows in ohms and the time during which the current flows. The total resistance is determined not only by the resistivity of the materials being welded but also is dependent to a large extent upon the pressure exerted between the workpieces.

Some materials, of which aluminum is an outstanding example, oxidize at an extremely rapid rate. One of the difficulties involved in welding aluminum and other similar materials is that the electrode contacting faces become contaminated after making one or more welds. This contamination is caused principally by the transfer of oxides from the surfaces of the aluminum workpieces being welded to the electrode contacting faces of the welding electrodes, whereby the current flowing through the weld is reduced in a random unpredictable manner. The result of this phenomenon is that the consistency of the successive welds is poor and the quality of subsequent welds deteriorates progressively until finally—often after only a few operations—the welds are no longer adequate structurally.

Previously, the electrode tips have been dressed after each weld to remove the undesirable contaminated material. This, of course is an expensive and time consuming process and the dressing must be very carefully performed in order to avoid substantial reduction in the life of the electrode tips and also to avoid deleterious effects arising from improper curvature of the tips. Another solution to the problem, previously resorted to, is that of cleaning the workpieces before inserting them into the welding apparatus. This technique also is disadvantageous, particularly where several welding operations must be performed in succession over a period of time, since substances, such as aluminum, oxidize so rapidly that the surfaces may become dirty before all of the welding is completed.

In accordance with the invention, a thin electrically conductive tape or a wire which may either be round or of special shape is disposed between the workpieces which oxidize readily and the adjacent welding electrode. If both workpieces are made of a rapidly oxidizing material, such as aluminum, a tape is inserted between each workpiece and the corresponding welding electrode; if, on the other hand, only one of the workpieces is a rapidly oxidizing material, a tape need be inserted only between that workpiece and the adjacent electrode. As each weld is made, the surface of the tape, or tapes, which is in contact with a workpiece, such as aluminum, becomes contaminated instead of the welding electrode itself. Means are provided for driving the tape past the electrodes in the interval between welds, that is, during the time when the force exerted by the welding electrodes is removed. The portion of the tape which carries the contaminating material is driven past a means for mechanically or chemically removing the contaminating material from the surface of the tape. For example, the tape may be driven past a rotating wire brush or other means for abrading the contaminating material as the tape passes by. The movement of the abrading means, of course, may be reciprocating, rather than rotary, and the path of motion of the abrading means, indeed, may be a combination of reciprocating and rotary movement. Alternately, the moving tape may be driven through the fluid cleaning means, such as a weak acid solution or a solution known in the trade as "Oakite," for a sufficient period of time to remove the contaminating material from the surface of the tape. It is possible, of course, to use chemical and mechanical cleaning means concurrently.

In applications where roller-type electrodes are used, the roller electrode may be driven past a rotating brush whereby the electrode is cleaned directly.

Other objects and advantages of this invention will become apparent as the description thereof progresses, reference being had to the accompanying drawing wherein:

FIG. 1 is a view showing a typical welding apparatus incorporating the invention;

FIG. 2 is a diagram of a modification of the apparatus of FIG. 1, wherein fluid decontamination of the tape is resorted to;

FIG. 3 is a simplified view of a welding arrangement using a roller-type electrode and wherein the tape is decontaminated by direct action;

FIG. 4 is a view showing a further welding arrangement involving roller-type electrodes wherein a tape is employed; and FIG. 5 is a view showing a possible tape decontaminating arrangement as applied to shunt welding systems.

Referring to the drawing, FIG. 1 discloses a typical welding head 10 which includes a stationary lower electrode 11, a movable upper electrode 13 and a mechanism enclosed within a housing 15, for effecting downward movement of the upper electrode 13 toward the lower electrode 11 until the necessary welding force is exerted on the workpieces 16 and 17 to be joined. The lower electrode 11 may be attached to an electrode holder 18 which is fixedly mounted to the vertical portion 19 of the welding head stand. The upper electrode 13 is secured to a portion 14 of the aforesaid mechanism. The details of this mechanism for moving the upper electrode and for maintaining the proper forging force between workpieces is of no immediate concern in this application, since the invention is not directed to such details. The broad principles of operation of such a mechanism may be stated, however. One typical mechanism includes a foot pedal which, when depressed, causes movement of a cam follower over a stationary cam, and, consequently, moves the upper electrode downward toward the workpieces to be welded. At the instant that the electrodes and workpieces come into contact, further depression of the foot pedal may transfer control of the upper electrode thrust to a loading spring, not shown, which is located behind the curved portion 21 of the welding head housing 15. The forging force is pre-set by an adjusting knob, not shown, which is turned until an indicator 22 is disposed opposite the desired force, as indicated on a graduated scale.

The electrodes 11 and 13 are made of an electrically conductive material, such as copper, the tips of which may be slightly curved in the usual manner. In order to avoid excessive wearing of the relatively soft copper, the electrode tips are sometimes formed of a hard electrically conductive material, such as an alloy of aluminum and copper.

As indicated in FIG. 1, a first electrically conductive member 24, in the form of a ribbon or tape, is disposed between the upper electrode 13 and workpiece 16, while a second electrically conductive tape 26 is positioned between the lower electrode 11 and the other work piece 17. Each tape may be moved along a closed path by means of a drive assembly 28. This drive assembly includes a motor 29, a gear box 30 mounted on a vertical supporting panel 31, said panel being attached to a horizontal work base 32. One output shaft 33 of the gear box 30 may extend through an opening in vertical panel 31 and may carry a drive pulley 34. A second output shaft 35 of the gear box 30 may extend through another opening in the supporting panel 31 and may carry a drive pulley 36. A second vertical supporting panel 37 is attached to the horizontal base 32 and provides support for two shafts 38 and 39 to which respective idler pulleys 41 and 42 may be attached. Two other idler pulleys 44 and 45 are supported from respective shafts 46 and 47, the latter projecting from a vertical member 48 which is attached to the underside of the horizontal base 32. The tape 26 may pass below the base 32 through slots 49 cut into the base. The portion of the drive system for the tape 24 may include one or more pulleys, not shown, in addition to pulleys 34 and 41, over which the tape 24 may pass. These additional pulleys may be mounted from any stationary supporting means, in a well known manner. Such pulleys have been omitted from the drawing for the sake of simplicity and clarity.

A pair of brushes 50 and 51, driven by motors 52 and 53, respectively, are mounted in contact with the corresponding tapes 24 and 26. The motors 52 and 53 may be mounted from a panel 54. The brushes may be permitted to rotate continuously, or only during periods when the tape is in motion. The brushes may be conventional wire brushes whose bristles are of the proper texture and size to remove the oxide film from the corresponding tape by its abrasive action. This abrasive action, which also is determined by the speed of movement of the brush, should be sufficiently gentle, however, to prevent formation of an excessively rough or scratched surface on the tape. Although rotary brushes are more convenient, the invention is not limited to rotary abrasive means, as previously pointed out. For example, reciprocating abrasive means or abrasive means having a complex motion may be directly in contact with the moving tape instead of the rotary abrasive means shown in FIG. 1.

After each welding operation is performed on a given set of work pieces 16 and 17, or after completion of a single welding operation on a pair of work pieces, as the case may be, the force exerted on the work pieces may be released and the tape moved to a new position with respect to electrodes 11 and 13. The brushes 50 and 51, of course, must be permitted to rotate until the portion of the tape containing the contaminating material is carried past the abrasive brush. Control means may be provided for synchronizing the time interval of rotation of the brushes 50 and 51 and the time interval of rotation of the brush drive motor 29, or for synchronizing the above two times of rotations with movement of the movable electrode 13 away from the stationary electrode 11. Another arrangement could use a constantly rotating brush which is automatically brought into contact with the tape when the tape is at rest for whatever time is necessary to accomplish cleaning.

In those applications wherein only one of the two work pieces is made of a metal which in prior welding equipment causes contamination of the adjoining welding electrode, it is possible to omit the corresponding tape. For example, in FIG. 1, if the upper work piece 16 is steel and the lower work piece 17 is aluminum, the tape 24 and its associated drive means can be eliminated; similarly, if the upper work piece 16 is aluminum and the lower work piece is steel, the tape 26 and its associated driving means may be omitted.

The tape should be as thin as possible without puncturing during the welding cycle. If the tape is made too thick, it will not follow the curvature of the electrode tape and the welding current tends to spread over a larger area without being concentrated in a definite spot; the welds so obtained are apt to be weak. If a thin tape is employed, however, the welding current tends to be concentrated in the area to be welded. A copper tape of the order of 0.003 inch thickness has been found satisfactory for welding together two aluminum strips, each about 0.008 inch thick and 0.25 inch wide.

A modified arrangement for removing the contaminating material from the tape 26 is shown in FIG. 2, wherein elements corresponding to those in FIG. 1 are referred to by like reference numerals. Although only one tape is shown in FIG. 2, it should be understood that two tapes may be used, just as in FIG. 1, as required. The tape 26 passes over pulleys 36, 42, 44, and 45 and also over additional pulleys 56, 57, and 58; the latter pulley may be mounted on a shaft attached to one wall of a fluid-containing vessel 60. This vessel, which may be mounted on a horizontal support 62, contains a cleaning agent 64 whose concentration and temperature depend upon the composition of the tape and the composition of the contaminating material deposited on the tape. Depending upon the cleaning solution used, it may also be necessary to wash the tape before drying in a neutralizing bath. The tape should be sufficiently long to permit adequate drying prior to reaching the region of the welding electrodes. One typical fluid may be a weak solution of hydrofluoric acid of about one to three percent by volume concentration. In order to prevent the tape from remaining in the solution during dwell periods of the welding machine, an arrangement whereby the tank containing the solution can be lowered during such periods may be desirable. It is necessary, when using acid solutions, to make sure that the rate of movement of the tape through the fluid is sufficiently rapid, so that the imersion time is under that at which deterioration of the tape itself occurs. Another solution which may be used is a two percent solution of nitric acid. Various solutions manufactured by Oakite Products, Inc., and designated as "Oakite" also may be used for the cleaning fluid 64. Such solutions having about six ounces per gallon concentration require about four to ten minutes for cleaning.

In FIG. 3, a simplified view of a welding arrangement adaptable for roller spot welding or roller seam welding is shown. In this apparatus, a wheel-type or roller electrode 66 is used. This roller electrode 66 may be carried on a shaft 65 mounted on the portion 19 of the stationary electrode support and replaces the rod-shaped electrode 11 shown in FIGS. 1 and 2. The roller electrode 66 may be rotated by a drive motor 67 having a drive wheel 68 mounted on the motor shaft 69. The rim of the drive wheel 68 engages the periphery of the roller electrode 66, causing rotation of the latter in a manner similar to that of rim-driven phonograph turntables. The rotating wheel electrode 66 contacts the work piece 17, while the upper electrode 13 may be a rod-type electrode similar to that shown in FIGS. 1 and 2. Both electrodes, of course, may be rotating wheel electrodes, in which case, suitable rotary drive means would be provided for the upper electrode, as well as for the lower electrode. When roller electrodes are used, it is possible to clean the electrode or electrodes directly by means of a rotary brush 70 driven by a motor 71 which is mounted in contact with the periphery of the roller electrode 66. It is also possible, of course, to use a tape for removal of the contaminating material (as in FIG. 1) rather than a rotary brush which contacts the rotary wheel electrode or electrodes directly.

A simplified modification of a rotary-type welder using two wheel electrodes 66 and 72 and tapes 24 and 26 is indicated in FIG. 4. Conductive tapes also may be used with a welder having a single wheel electrode and a rod-type electrode, such as shown in FIG. 3, as well as with the welder of FIG. 4, which has two wheel electrodes; in such a case, the brush 70 of FIG. 3 would be eliminated and a tape 26 inserted between work piece 17 of FIG. 3 and the wheel electrode 66. The contacting work pieces 16 and 17 of FIG. 4 are disposed between upper wheel electrode 72 and a lower wheel electrode 66. These electrodes are mounted on respective shafts 65 and 73 driven by a suitable mover. The electrically conductive tapes 24 and 26, such as those already described in connection with FIGS. 1 and 2, are disposed between corresponding work pieces and the adjacent wheel electrode, as shown in FIG. 4. A single tape is adequate in those cases where only one of the two work pieces is such as to cause electrode contamination; in such cases, one of the tapes of FIG. 4 may be omitted.

FIG. 5 shows the relationship between the work pieces, the tapes, and the welding electrodes in a shunt welding application, as contrasted with the series welding setups illustrated in FIGS. 1 to 4. Shunt welding is particularly suitable for applications in which it is difficult to insert the work pieces between oppositely disposed welding electrodes which are in relative motion. As shown in FIG. 4, the welding electrodes 81 and 83 are disposed on the same side of the materials to be welded and an electrode 85 is located opposite the two electrodes 81 and 83 on the opposite side of the materials to be welded. In this arrangement, two tapes 84 and 86 are used adjacent the work piece and the coresponding electrodes 81 and 83. If both work pieces are such as to cause contamination in prior welding equipment, an additional tape 88 may be used, it being disposed opposite the first pair 84, 86, and between the work piece 16 and the electrode 85. Tape 88 may be omitted, however, if the upper work piece 16 is made of a "non-contaminating" material, such as steel or copper.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a device for welding together two contacting work pieces, the combination of a pair of welding electrodes between which said work pieces are supported, electrically conductive means disposed between at least one of said work pieces and the electrode adjacent thereto, means for effecting movement of said conductive means relative to said electrodes during the absence of welding, and cleaning means for said conductive means disposed adjacent the path of said conductive means and synchronized with said movement for cleaning said conductive means during movement thereof.

2. In a device for welding together two contacting work pieces, the combination of a pair of welding electrodes between which said work pieces are supported, a pair of thin electrically conductive members each disposed between one of said work pieces and the electrode adjacent thereto, means for effecting movement of said conductive members relative to said electrodes during the absence of welding, and cleaning means for said conductive members disposed adjacent the path of said conductive members and synchronized with said movement for cleaning said conductive members during movement thereof.

3. In a device for welding together two contacting work pieces, the combination of a pair of welding electrodes between which said work pieces are supported, electrically conductive means disposed between at least one of said work pieces and the electrode adjacent thereto, said conductive means being in contact with a corresponding one of said work pieces and with the adjacent electrode during welding, means for effecting movement of said conductive means relative to said electrodes during the absence of welding, and celaning means disposed adjacent the path of movement of said conductive means and synchronized with said movement for removing contaminating material formed on said conductive means during welding.

4. In a device for welding together two contacting work pieces, the combination of a pair of welding electrodes between which said work pieces are supported, electrically conductive means disposed between at least one of said work pieces and the electrode adjacent thereto, said conductive means being in contact with a corresponding one of said work pieces and with the adjacent electrode during welding, means for effecting movement of said conductive means relative to said electrodes during the absence of welding, and cleaning means disposed adjacent the path of movement of said conductive means and synchronized with said movement for removing contaminating material formed on said conductive means during welding, said cleaning means including a movable abrasive means contacting said conductive means.

5. In welding equipment having a pair of welding electrodes for welding together two contacting work pieces, at least one of which work pieces causes contaminating material to be formed upon material in direct contact therewith during welding, an electrically conductive tape disposed between said one work piece and said adjoining electrode, the surface of said tape facing said adjoining electrode collecting said contaminating material on a portion thereof adjacent the corresponding electrode during welding, means for moving the contaminated portion of said tape from the vicinity of said electrodes during the absence of welding, and means synchronized with said movement for removing said contaminating material from said tape during motion of said tape past said means for removing.

6. In welding equipment having a pair of welding electrodes for welding together two contacting work pieces, at least one of which work pieces causes contaminating material to be formed upon material in direct contact therewith during welding, an electrically conductive tape disposed between said one work piece and said adjoining electrode collecting said contaminating material on a portion thereof adjacent the corresponding electrode during welding, means for moving the contaminated portion of said tape from the vicinity of said electrodes during the absence of welding, and means synchronized with said movement for removing said contaminating material from said tape during motion of said tape past said means for removing, said means for removing including a movable abrading device moving in contact with said tape.

7. In resistance welding equipment for welding together two contacting work pieces wherein contaminating material is formed during welding, the combination of a pair of welding electrodes, electrically conductive means disposed between each of said work pieces and a corresponding adjacent electrode for collecting said contaminating material, means for moving said conductive means relative to said electrodes during intervals between welding, and means synchronized with said movement for mechanically removing said contaminating material from said conductive means during movement thereof.

8. In resistance welding equipment for welding together two contacting work pieces wherein contaminating material is formed during welding, the combination of first and second welding electrodes disposed on one side of said work pieces, a third welding electrode disposed on the opposite side of said work pieces, electrically conductive means disposed between each of said first and second electrodes and the work piece adjacent thereto for collecting said contaminating material, means for moving said conductive means relative to said electrodes during intervals between welding, and means synchronized with said movement for removing said contaminating material from said conductive means during movement thereof.

9. In resistance welding equipment for welding together two contacting work pieces wherein contaminating material is formed during welding, the combination of a pair of welding electrodes, and electrically conductive means disposed between each of said work pieces and a corresponding adjacent electrode for collecting said contaminating material, means for moving said conductive means relative to said electrodes during intervals between welding, and means synchronized with said movement for removing said contaminating mixture from said conductive means during movement thereof.

10. In resistance welding equipment for welding together two contacting work pieces wherein contaminating material is formed during welding, the combination of first and second welding electrodes disposed on one side of said work pieces, a third welding electrode disposed on the opposite side of said work pieces, electrically conductive means disposed between said third electrode and the work piece adjacent thereto for collecting said contaminating material, means for moving said conductive means relative to said electrodes during intervals between welding, and means synchronized with said movement for removing said contaminating material from said conductive means during movement thereof.

References Cited in the file of this patent

UNITED STATES PATENTS

| | | |
|---|---|---|
| 857,507 | Fulton et al. | July 2, 1907 |
| 1,308,778 | Gravell | July 8, 1919 |
| 2,300,700 | Porter | Mar. 3, 1942 |
| 2,319,401 | Hebele | May 18, 1943 |
| 2,812,417 | Busse et al. | Nov. 5, 1957 |

FOREIGN PATENTS

| | | |
|---|---|---|
| 571,401 | Great Britain | Aug. 23, 1945 |

UNITED STATES PATENT OFFICE
CERTIFICATE OF CORRECTION

Patent No. 3,015,713             January 2, 1962

Richard C. Eckler et al.

It is hereby certified that error appears in the above numbered patent requiring correction and that the said Letters Patent should read as corrected below.

Column 5, line 74, for "celaning" read -- cleaning --; column 8, line 9, under the heading "UNITED STATES PATENTS", for "857,507" read -- 858,507 --.

Signed and sealed this 29th day of May 1962.

(SEAL)
Attest:

ERNEST W. SWIDER
Attesting Officer

DAVID L. LADD
Commissioner of Patents